United States Patent [19]

Rhoades

[11] 4,168,856
[45] Sep. 25, 1979

[54] MEAT MANIPULATING TOOL

[76] Inventor: Ben A. Rhoades, Rte. 1, Box 126, Arroyo Grande, Calif. 93420

[21] Appl. No.: 918,786

[22] Filed: Jun. 26, 1978

[51] Int. Cl.$^2$ ............................................ A47J 43/28
[52] U.S. Cl. .......................................... 294/8; 294/26
[58] Field of Search ...................... 294/8, 26, 17, 55.5, 294/7, 19 R

[56] References Cited

U.S. PATENT DOCUMENTS

| | | | |
|---|---|---|---|
| 3,162,475 | 12/1964 | Van Allen | 294/26 |
| 3,463,533 | 8/1969 | Repiscak et al. | 294/26 |
| 3,758,143 | 9/1973 | Godlewski | 294/8 |

*Primary Examiner*—James B. Marbert
*Attorney, Agent, or Firm*—Lyon & Lyon

[57] ABSTRACT

A meat manipulating tool, particularly adapted for barbecuing, which includes a shaft provided with a handle at one end and a half circle skewer hook extending laterally from the extended end of the shaft for penetrating a steak or the like to overturn the steak or to lift the steak from the barbecue; the shaft being further provided at its extended end portion with an essentially rectangular turner plate extending in the opposite direction from the skewer hook, the turner being laterally movable by the shaft to slip under a steak or a hamburger for removal, or rotated to overturn the article being cooked.

2 Claims, 4 Drawing Figures

MEAT MANIPULATING TOOL

BACKGROUND AND SUMMARY

Turner plates and skewer hooks are tools which have extensive use in cooking, especially barbecuing; however, they have not been provided with a common handle.

The present invention is directed to a meat manipulating tool, wherein the manipulation of a skewer hook and a turner plate is accomplished by a single handle, the tool being rotated in one direction to pierce a food product such as a steak, for turning or transport, or move laterally in the opposite direction to underlie a food product such as a hamburger for turning or transport.

DETAILED DESCRIPTION

Figure 2:
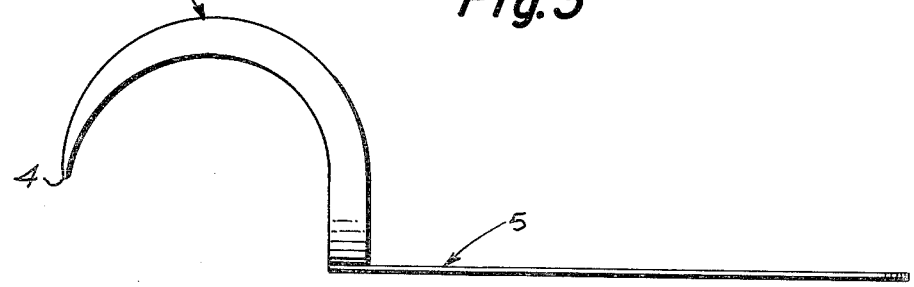
FIG. 2 is an end view thereof taken from 2—2 of FIG. 1 showing the tool approximately full size.
Figure 1:
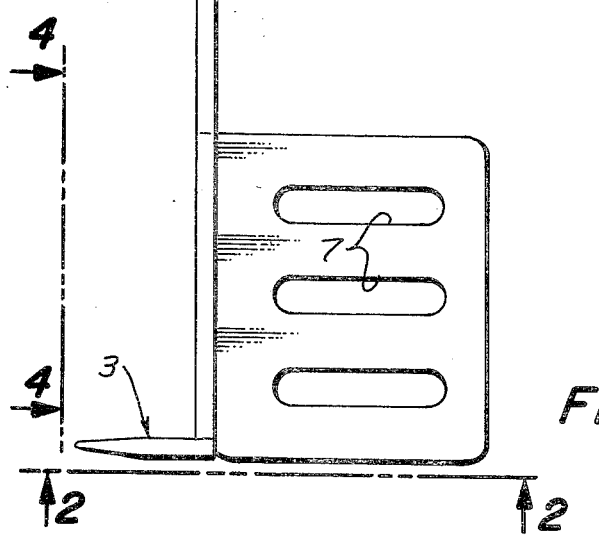
FIG. 1 is a plan view of the meat manipulating tool shown at reduced scale.

The meat manipulating tool includes a shaft 1 having a handle 2 at one end. The other end is provided with an integral skewer hook 3 disposed in the plane at right angle to the shaft 1. As viewed in FIG. 2, the hook curves upwardly from the shaft and forms a half circle terminating in a point 4 offset upwardly a short distance from the shaft 1.

Secured to the underside of the shaft 1 is a turner plate 5, one edge of which is in the plane defined by the skewer hook 3. The turner plate is joined by spot welds 6 or other means to the shaft 1. The plate is preferably formed of high strength stainless steel of relatively thin gauge so as to have high flexibility. To increase the flexibility, the turner plate may be provided with slots 7.

The meat manipulating tool is operated as follows:

The skewer hook 3 is used when barbecuing steaks or the like which may be manipulated by the skewer hook 3 for the purpose of turning the steak in the course of cooking or for transporting the steak from the barbecue or to the barbecue. As viewed in FIG. 2, the skewering action is in a counter-clockwise direction so that the turner plate 5 is lifted and is free of interference with the skewer hook. The turner plate 5 is used for hamburgers or other food which cannot be manipulated by the skewer hook. The turner plate may be slipped under the food member and manipulated to overturn the food member. Also, the plate may be used for transporting the food member to or from the barbecue. It will be noted that manipulation of the turner plate 5 can be accomplished without interference by the skewer hook 3. This is due in part to the fact that the pointed end 4 of the skewer hook 3 is disposed above the plane defined by the turner plate 5.

Figure 4:
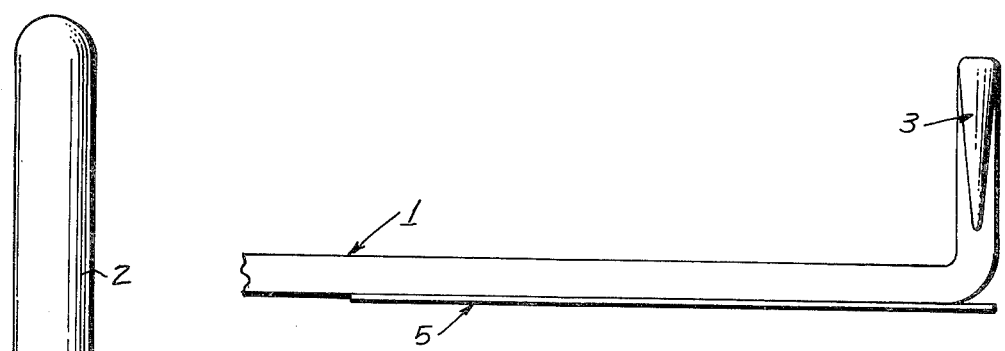
FIG. 4 is a fragmentary side view thereof taken from 4—4 of FIG. 1.
Figure 3:
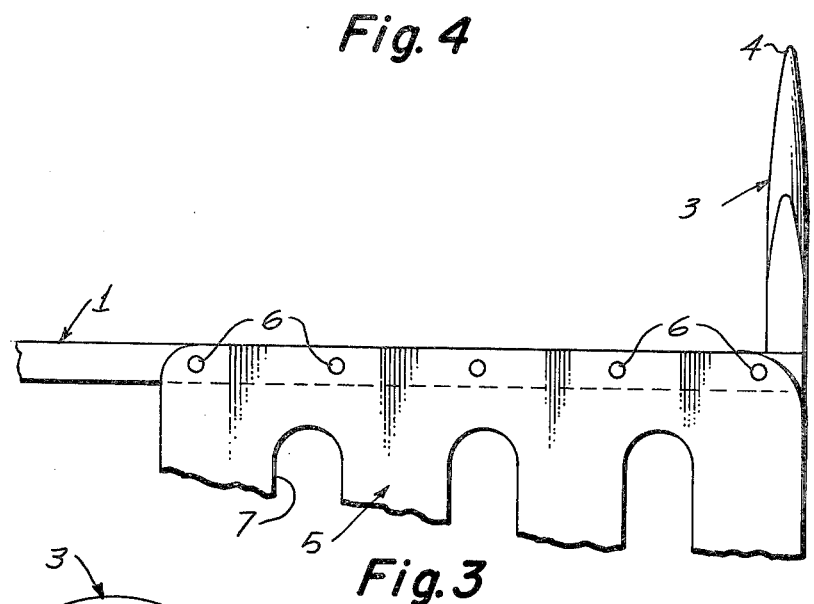
FIG. 3 is a fragmentary bottom view thereof.

The meat manipulating tool may be constructed such that, making reference to FIG. 3, the orientation of the skewer hook 3 and turner plate 5 may be reversed such that the tool is more easily utilized by a left handed user.

Having fully described my invention, it is to be understood that I am not to be limited to the details herein set forth, but that my invention is of the full scope of the appended claims.

I claim:

1. A meat manipulating tool, comprising:
   a. a shaft member having a handle at one end;
   b. a laterally extending skewer hook at the other end of the shaft;
   c. a turner plate secured to the shaft adjacent the skewer hook and extending laterally from the shaft in the opposite direction from the skewer hook and defining a plane substantially coincident with the shaft member;
   d. said skewer hook being of a semicircular shape extending from the shaft member first in an upward direction perpendicularly away from the plane of the turner plate, then laterally away from the turner plate and then back downwardly toward the turner plate and terminating at a point disposed above the plane of the turner plate for allowing operative manipulation of the turner plate laterally and forwardly without causing the skewer hook to contact an underlying surface; and
   e. said turner plate having a forward-most edge extending laterally at substantially the location of said skewer hook for allowing operative manipulation of the skewer hook in the forward direction and in a rotating direction without interference from the turner plate.

2. A meat manipulating tool, as defined in claim 1, wherein said turner plate is provided with slots therethrough extending in the lateral direction away from the shaft member.

* * * * *